United States Patent [19]
Engle

[11] Patent Number: 6,039,409
[45] Date of Patent: Mar. 21, 2000

[54] SHUTOFF VALVE ASSEMBLY

[75] Inventor: Thomas E. Engle, Clayton, N.Y.

[73] Assignee: Westinghouse Air Brake Company, Wilmerding, Pa.

[21] Appl. No.: 08/947,799

[22] Filed: Oct. 8, 1997

[51] Int. Cl.[7] ...................................................... B61G 5/00
[52] U.S. Cl. ................................................. 303/7; 213/1.3
[58] Field of Search ....................... 303/3, 7, 20; 213/1.3

[56] References Cited

U.S. PATENT DOCUMENTS

| | | |
|---|---|---|
| 3,251,480 | 5/1966 | Pentl et al. . |
| 3,646,498 | 2/1972 | Reed . |
| 3,773,186 | 11/1973 | Reno et al. . |
| 3,812,444 | 5/1974 | Reno . |
| 5,586,668 | 12/1996 | Miller ........................................ 213/1.3 |

*Primary Examiner*—Matthew C. Graham
*Attorney, Agent, or Firm*—James Ray & Associates

[57] ABSTRACT

A railroad brake line shutoff valve assembly for connecting a car mounted railway brake line to a brake line air hose. The assembly includes a shutoff valve with a stationary valve portion and a moveable valve portion. The stationary valve portion has a first fluid line attachment site and a second fluid line attachment site. Movement of the moveable valve portion to one position opens a flowpath through the valve between the first fluid line attachment site and the second fluid line attachment site. Movement of the moveable valve protion to another position closes the flowpath through the valve. The assembly includes a junction box having a first set of electric line attachment sites for connection of a set of car mounted electrical trainline conductors mounted on the railway vehicle and a second set of electric line attachment sites for connection of a set of electrical line end segments which terminate in a multiple contact electrical trainline connector. The junction box also has a third set of electric line of at least one of an electronic system or an electrical system located on the railway vehicle. Each member of the first set of electric line attachment sites is electrically connected to a corresponding member of the second set of electric line attachment sites and also to a corresponding member of the third set of electric line attachment sites.

20 Claims, 5 Drawing Sheets

SHUTOFF VALVE ASSEMBLY

CROSS-REFERENCE TO RELATED APPLICATIONS

The invention described in the present patent application is closely related to the following patent applications which are owned by the assignee of the present application. The teachings of each of these applications is incorporated into the present application by reference thereto. Imbedded Electrical Connector, Ser. No. 08/688,436: Filed Jul. 30, 1996, now abandoned. Hose Coupling With, Electrical Contacts, Ser. No. 08/803,261: Filed Feb. 20, 1997 now U.S. Pat. No. 5,980,028. Electrical Contact Arrangement for Hose Coupling, Ser. No. 08/803,262: Filed Feb. 20, 1997 now U.S. Pat. No. 5,957,713.

FIELD OF THE INVENTION

The present invention relates, in general, to a shutoff valve for a railroad brake line and to a junction box for attachment of railroad car electrical and electronic systems.

BACKGROUND OF THE INVENTION

The following five United States patents relate to the art of making electrical connections between electric lines in adjacent railway cars.

U.S. Pat. No. 3,251,480, issued to K. L. DePenti et al on May 17, 1966. This patent provides a connector for automatic connection of fluid pressure conduits and electrical circuits. The connector is located underneath the coupler and joining of the connectors is intended to occur automatically as the cars are coupled. This system is inconsistent with the industry standard brake line fluid pressure connector. No redundancy of contacts is provided, nor wiping action.

U.S. Pat. No. 3,646,498, issued to R. T. Reed et al on Feb. 29, 1972. This is an electrical connector which is not associated with a fluid pressure connector. Electrical contacts are embedded in insulating blocks, and are brought into electrical contact by pins activated when the connectors are joined. No redundancy of contacts is provided, nor wiping action.

U.S. Pat. No. 3,773,186, issued to W. H. Reno et al on Nov. 20, 1973. This patent has contacts in bores, which are placed in electrical contact by fluid pressure. No redundancy of contacts is provided, nor wiping action.

U.S. Pat. No. 3,812,444, issued to W. H. Reno on May 21, 1974. This is a combined fluid pressure connector and electrical connector which is inconsistent with the industry standard brake line fluid pressure connector. No redundancy of contacts is provided, nor wiping action.

U.S. Pat. No. 5,586,668, issued to Craig Miller on Dec. 24, 1996. This patent describes a fluid pressure connector for joining brake airlines in coupled railway vehicles. The invention includes electrical contacts which join electrical communication lines in the two railway vehicles. This invention can be connected to the industry standard brake line fluid pressure connector for fluid pressure connection only. In this manner, a railway vehicle equipped with the new connector can be joined to a railway vehicle equipped with the old connector and still retain the required brake line fluid pressure connection. This invention implicitly presupposes that if electronic systems on a railway vehicle joined by this connector are to be connected to the electrical communication lines which are connected between railway vehicles, a junction box would be mounted on the railway vehicle and the cables to the electronic apparatus and the electrical communication lines which are connected between railway vehicles are joined in the junction box.

The applications which are cited above describe various proposed alternative configurations for combined fluid pressure connectors and electrical communication line connectors. The application having Ser. No. 08/688,436 describes a shutoff valve for closing the brake line which is used when a railway vehicle is disconnected from an adjacent vehicle. In practice, as when two cars are deliberately uncoupled, at least one of the valves on one of the adjacent ends of the two coupled cars is closed before the cars are pulled apart, which is when the airlines pull apart and are thereby disconnected.

In the application just cited, the moveable portion of the valve is connected to a moveable portion of an electrical switch so that when the valve is closed, prior to separating two railway vehicles, the switch is opened so that when the connectors pull apart, no voltages will be present on the exposed contacts of the electrical portions of the connectors.

None of the applications cited above provide means for connection of electrical or electronic systems on a railway vehicle to electrical trainline cables connected between railway vehicles. Generally, to provide connection of electrical or electronic systems, a special junction box is provided which is mounted on the railway vehicle and to which the trainline cables are attached and to which a branching electrical cable is attached which in turn is attached to the electrical or electronic systems.

If a railway vehicle is not equipped with such a junction box, then in order to retrofit it with an electrical or electronic system, it is necessary to install a junction box.

SUMMARY OF THE INVENTION

In a first aspect, the present invention provides a railroad brake line shutoff valve assembly for connection to a car-mounted railway brake line disposed on a first railway vehicle and to a brake line air hose. The brake line air hose is for terminating in a brake line connector which is for connection to a similar brake line connector on a second railway vehicle coupled to the first railway vehicle. The shutoff valve assembly has a stationary valve portion and a moveable valve portion, the stationary valve portion having a first fluid line attachment site for attachment of the car mounted railway brake line and a second fluid line attachment site for attachment of the brake line air hose. Motion of the moveable valve portion relative to the stationary valve portion to a first position opens a flowpath through the valve portion between the first fluid line attachment site and the second fluid line attachment site so that the brake line air hose is connected to the car-mounted brake line. A motion of the moveable valve portion relative to the stationary valve portion to a second position closes the flowpath through the valve portion between the first fluid line attachment site and the second fluid line attachment site so that the brake line air hose is not then connected to the car mounted railway brake line. The valve also has an electrical switch for connection to a set of car-mounted electrical trainline conductors mounted on the first railway vehicle and to a set of electrical line end segments, the electrical line end segments terminating in a multiple contact electrical trainline connector. The electrical trainline connector is for connection to a similar electrical trainline connector on the second railway vehicle coupled to the first railway vehicle. The electrical switch has a stationary portion and a moveable portion, the stationary portion of the switch having a junction box. The junction box has a set of first electric line attachment sites for attachment of the car mounted electrical trainline conductors and a set of second electric line attachment sites for attachment of the electrical line end segments. A motion of the moveable portion of the switch relative to the stationary portion of the switch to a first position making a plurality of switch electrical connections between the set of first electric line attachment sites and the set of second electric line attachment sites so that the electrical line end segments are electrically connected to respective members of the car mounted electrical trainline conductors. Likewise, a motion of the moveable portion of the switch relative to the stationary portion of the switch to a second position breaks the electrical connections between the first electric line attachment sites and the second electric line attachment sites so that the electrical line end segments are not electrically connected to the electrical trainline conductors.

The stationary portion of the electrical switch is mechanically connected to the stationary valve portion and the moveable portion of the electrical switch is mechanically connected to the moveable valve portion, so that when the valve portion is in the first valve position, then the switch is in the first switch position and when the valve portion is in the second valve position then the switch is in the second switch position, so that when the moveable valve portion is placed in the first valve position relative to the stationary valve portion so that the valve is opened, the electrical switch is closed and so that when the moveable valve portion is placed in the second valve position relative to the stationary valve portion so that the valve is closed, the electrical switch is opened.

Means are attached either to the moveable valve portion or the moveable portion of the switch for moving the moveable valve portion from the first valve position to the second valve position and for moving the moveable portion of the switch from the first switch position to the second switch position, and for moving the moveable valve portion from the second valve position to the first valve position and the moveable portion of the switch from the second switch position to the switch position.

The junction box also has a set of third electric line attachment sites, the third electric line attachment sites having electrical connections to respective members of the first electric line attachment sites. Also, the third electric line attachment sites are for connection of respective conductors of a branch electric line to either an electronic system or an electrical system located on the first railway vehicle.

In another aspect, the present invention provides a railroad brake line shutoff valve assembly for connection to a car-mounted railway brake line disposed on a first railway vehicle and to a brake line air hose, the brake line air hose for terminating in a brake line connector. The brake line connector is for connection to a similar brake line connector on a second railway vehicle coupled to the first railway vehicle. The shutoff valve assembly has a stationary valve portion and a moveable valve portion, the stationary valve portion having a first fluid line attachment site for attachment of the car mounted railway brake line and a second fluid line attachment site for attachment of the brake line air hose, a motion of the moveable valve portion relative to the stationary valve portion to a first position opening a flowpath through the valve between the first fluid line attachment site and the second fluid line attachment site so that the brake line air hose is connected to the car-mounted brake line and a motion of the moveable valve portion relative to the stationary valve portion to a second position closing the flowpath through the valve between the first fluid line attachment site and the second fluid line attachment site so that the brake line air hose is not connected to the car mounted railway brake line.

Means are attached to the moveable valve portion for moving the moveable valve portion from the first position to the second position and from the second position to the first position.

The valve includes an electrical junction box having a first set of electric line attachment sites for connection of a set of car-mounted electrical trainline conductors mounted on the first railway vehicle and a second set of electric line attachment sites for connection of a set of electrical line end segments which are for terminating in a multiple contact electrical trainline connector, the electrical trainline connector for connection to a similar electrical trainline connector on the second railway vehicle coupled to the first railway vehicle.

The junction box also includes a third set of electric line attachment sites for connection of respective conductors of a branch electric line for connection to either an electronic system or an electrical system located on the first railway vehicle. Each member of the first set of electric line attachment sites is electrically connected to a corresponding member of the second set of electric line attachment sites and also to a corresponding member of the third set of electric line attachment sites.

The present invention also provides a method for connecting either an electronic system or an electrical system mounted on the railway vehicle to individual conductors of an electrical trainline cable mounted on the railway vehicle. The method also includes connecting individual conductors of an electrical line end segment, connected to a multiple contact trainline conductor for connection to a similar trainline conductor on an adjacent railway vehicle, to the electrical trainline cable and for providing a brake line shutoff valve. The method includes providing a brake line shutoff valve with an electrical junction box. The junction box has a first set of electric line attachment sites, a second set of electric line attachment sites and a third set of electric line attachment sites. Each member of the first set of electric line attachment sites is electrically connected to a corresponding member of the second set of electric line attachment sites and also to a corresponding member of the third set of electric line attachment sites. The method includes connecting each individual conductor of the trainline to a corresponding member of the first set of electric line attachment sites and connecting each individual conductor of the electrical line end segment to a corresponding member of the second set of electric line attachment sites. The method also includes providing a branch electrical line having a plurality of individual conductors and connecting each individual conductor of the branch electrical line to a corresponding member of the third set of electric line attachment sites. The branch electric line is connected to an electronic system or an electrical system mounted on the railway vehicle.

OBJECTS OF THE INVENTION

It is, therefore, one of the primary objects of the present invention to provide for a railway vehicle a junction box to which trainline cables may be connected and to which a branch electric line connected to electric or electronic systems on the railway vehicle may be connected.

It is a further object of the present invention to provide an electrical junction box disposed on a brake line shutoff valve so that mounting of the brake line shutoff valve provides mounting for the junction box.

It is an additional object of the present invention to provide a railway brake line shutoff valve having a switch connected to the valve so that when the shutoff valves on a pair of coupled railway vehicles are closed and the vehicles are separated, and their coupled cables uncoupled, exposed contacts on the electrical connectors carry no voltage and in the same system to provide a junction box on the switch to accommodate a cable connected to electronic or electrical equipment on the railway vehicle.

Another object of the present invention is to reduce the number of fault-prone connections along a trainline which passes from railway vehicle to railway vehicle down the length of a train.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
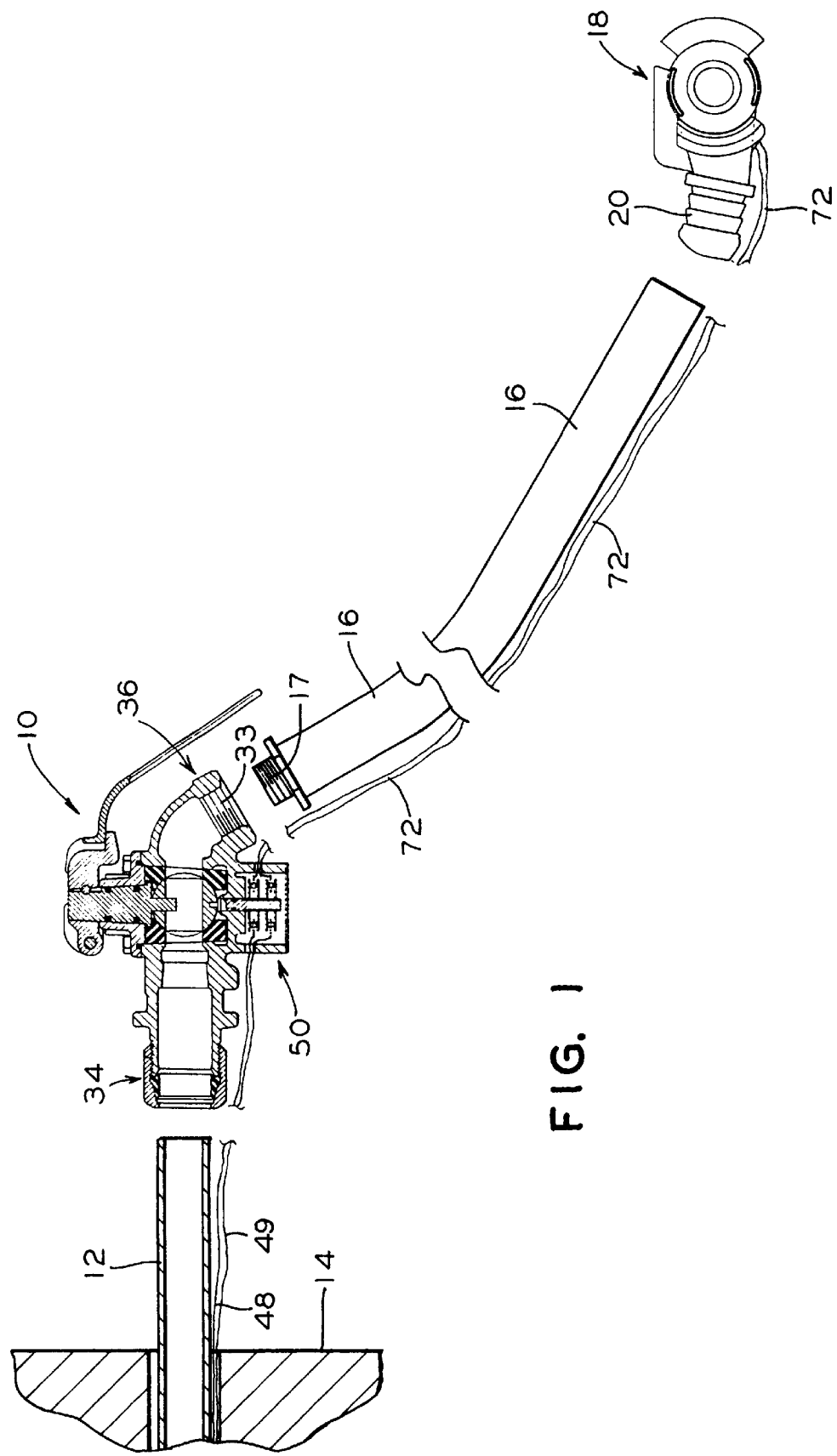
FIG. 1 shows a brake line shutoff valve assembly which includes an electrical switch, the assembly for mounting on a railway vehicle.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

FIG. 1 shows a first embodiment of the invention and the components to which it is attached. Brake line shutoff valve assembly 10 is for attachment to a brakepipe 12 located on railway vehicle 14. Brake line valve assembly 10 is attached to brakepipe 12 at first fluid line attachment site 34. Brake line air hose 16 is attached to valve assembly 10 at second fluid line attachment site 36. Gladhand assembly 18 is also attached to brake line air hose 16.

Gladhand assembly 18 is for attachment to a similar gladhand assembly on another railway vehicle to which railway vehicle 14 is coupled. Brake line valve assembly 10 has a switch 50 to which are mounted a set of car mounted electrical trainline conductors 48, conduction lines 49 to electrical or electronic equipment on railway vehicle 14 and also conductors of electrical line end segment 72.

Figure 2A:
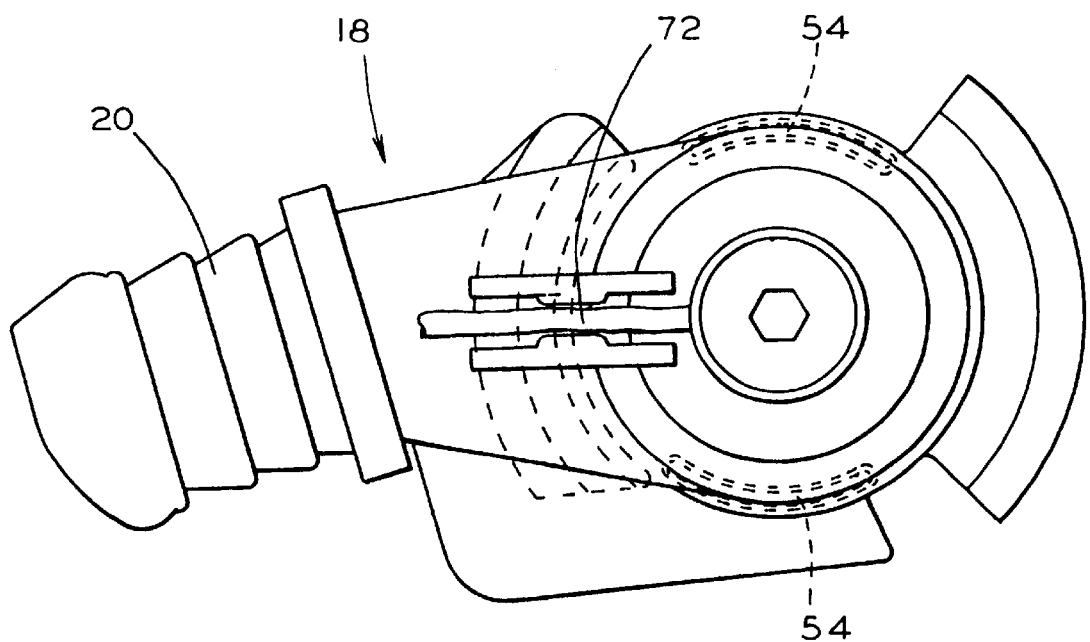
FIG. 2A shows a gladhand assembly of the prior art which connects both the pneumatic brake lines and electrical trainlines of two coupled railway vehicles, viewed from a direction opposite the mating surface of the gladhand assembly.
Figure 2B:
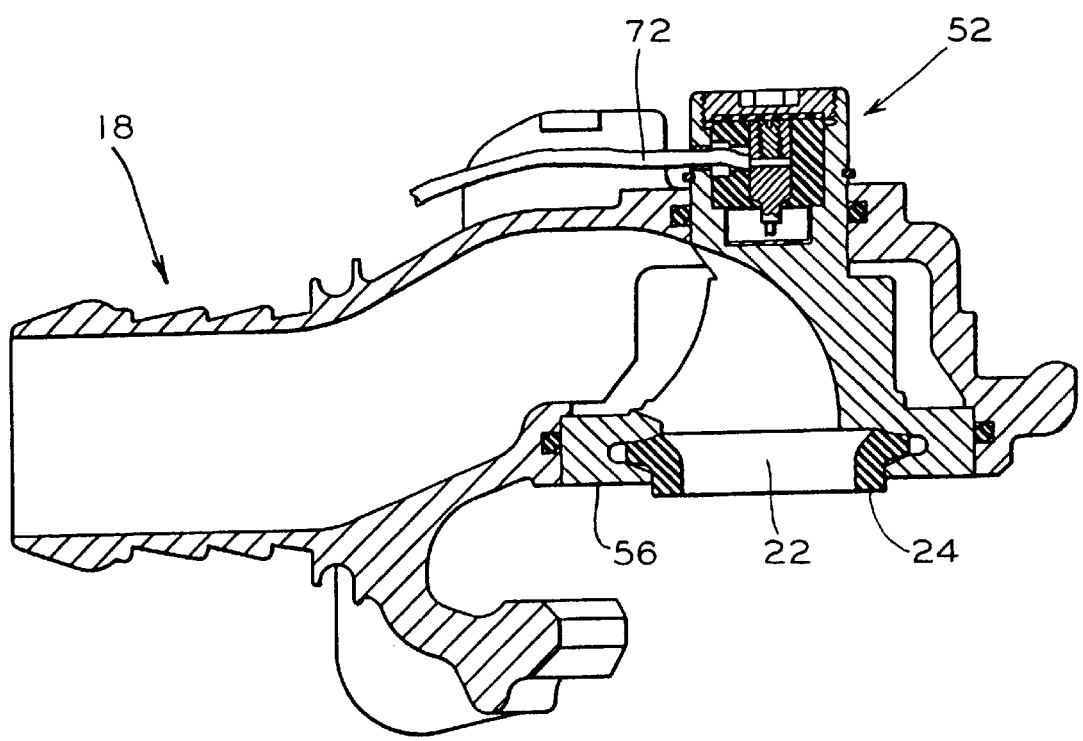
FIG. 2B shows a sectional drawing of the gladhand assembly.
Figure 2C:
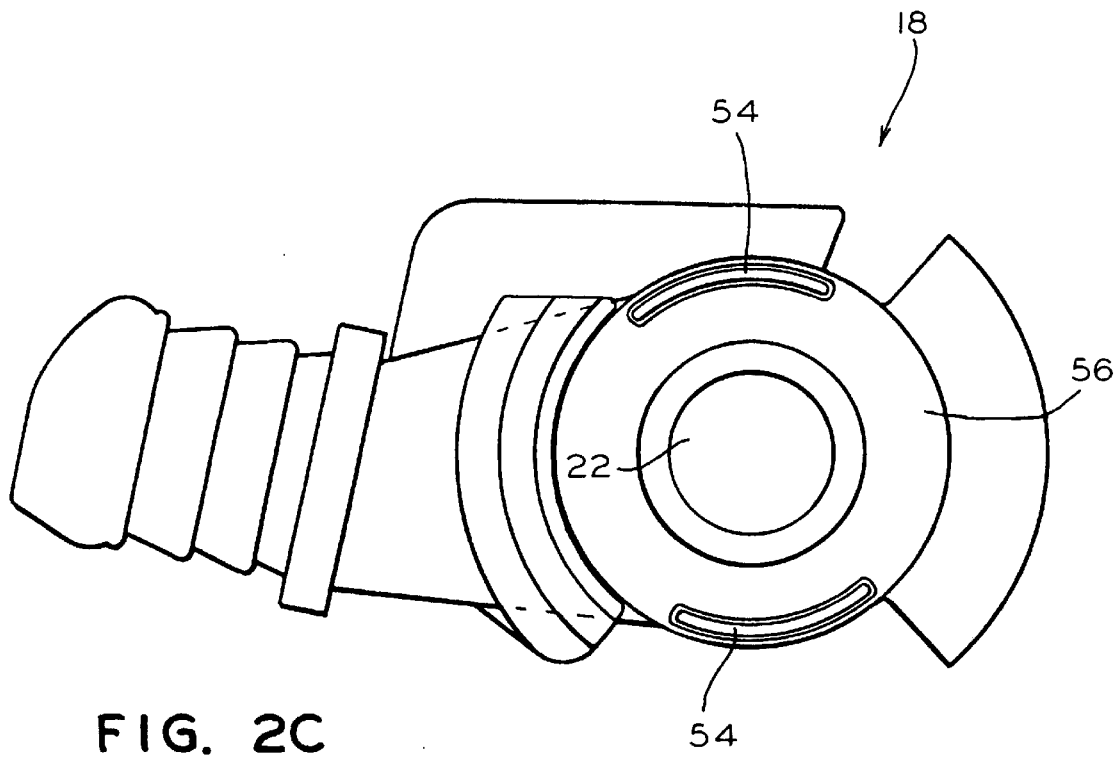
FIG. 2C shows a view of the gladhand looking toward the mating surface.

FIGS. 2A, 2B and 2C show details of gladhand assembly 18. Gladhand assembly 18 is not part of the present invention but it is a preferred apparatus for connecting brake line air hose 16 and electrical line end segment 72 of two coupled railway vehicles. Details of gladhand assembly 18 are provided by the above referenced application: Hose Coupling With Electrical Contacts, Ser. No. 08/803,261.

FIG. 2A shows gladhand assembly 18 viewed from the side opposite its mating surface. FIG. 2B is a section cut through gladhand assembly 18 and FIG. 2C shows gladhand assembly 18 from the side of the mating surface 56.

Gladhand assembly 18 is attached to brake line air hose 16 at brake line connection means 20. Electrical line end segment 72 is attached to gladhand assembly 18 as shown in FIG. 2B. Multiple contact electrical trainline connection means 52 includes electrical contacts 54 which are connected to individual strands of electrical line end segment 72 by electrical conduction pathways (not shown) in gladhand assembly 18. Electrical contacts 54 protrude from mating surface 56 to make electrical connection between gladhand assembly 18 and a similar gladhand assembly (not shown) to which assembly 18 is attached. Compressible seal 24 surrounds orifice 22 which provides pneumatic connection between the coupled gladhand assemblies.

Figure 3:
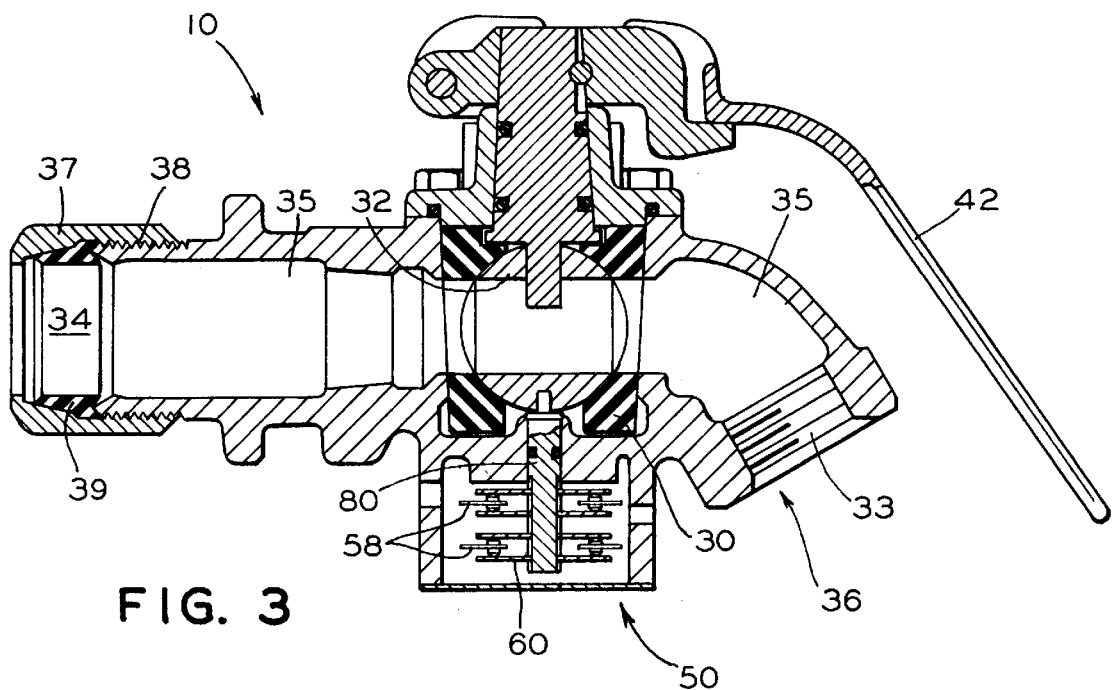
FIG. 3 shows the valve assembly in detail.

FIG. 3 shows a brake line shutoff valve assembly 10. This figure shows stationary valve portion 30 which cooperates with moveable valve portion 32 to open and close airflow pathway 35 between first fluid line attachment 34 and second fluid line attachment site 36. First fluid line attachment site 34 may be a compression fitting including compression nut 37 engaging threads 38 to compress compression seal 39 which grips the O.D. of brakepipe 12. Second fluid line attachment site 36 may have internal pipe threads 33 for attachment of brake line pipe nipple 17 (seen in FIG. 1) on brake line air hose 16.

Brake line shutoff valve assembly 10 includes electrical switch 50 which includes switch stationary portion 58 and switch moveable portion 60, which is mechanically connected to valve moveable portion 32 by shaft connection 80.

Figure 4:
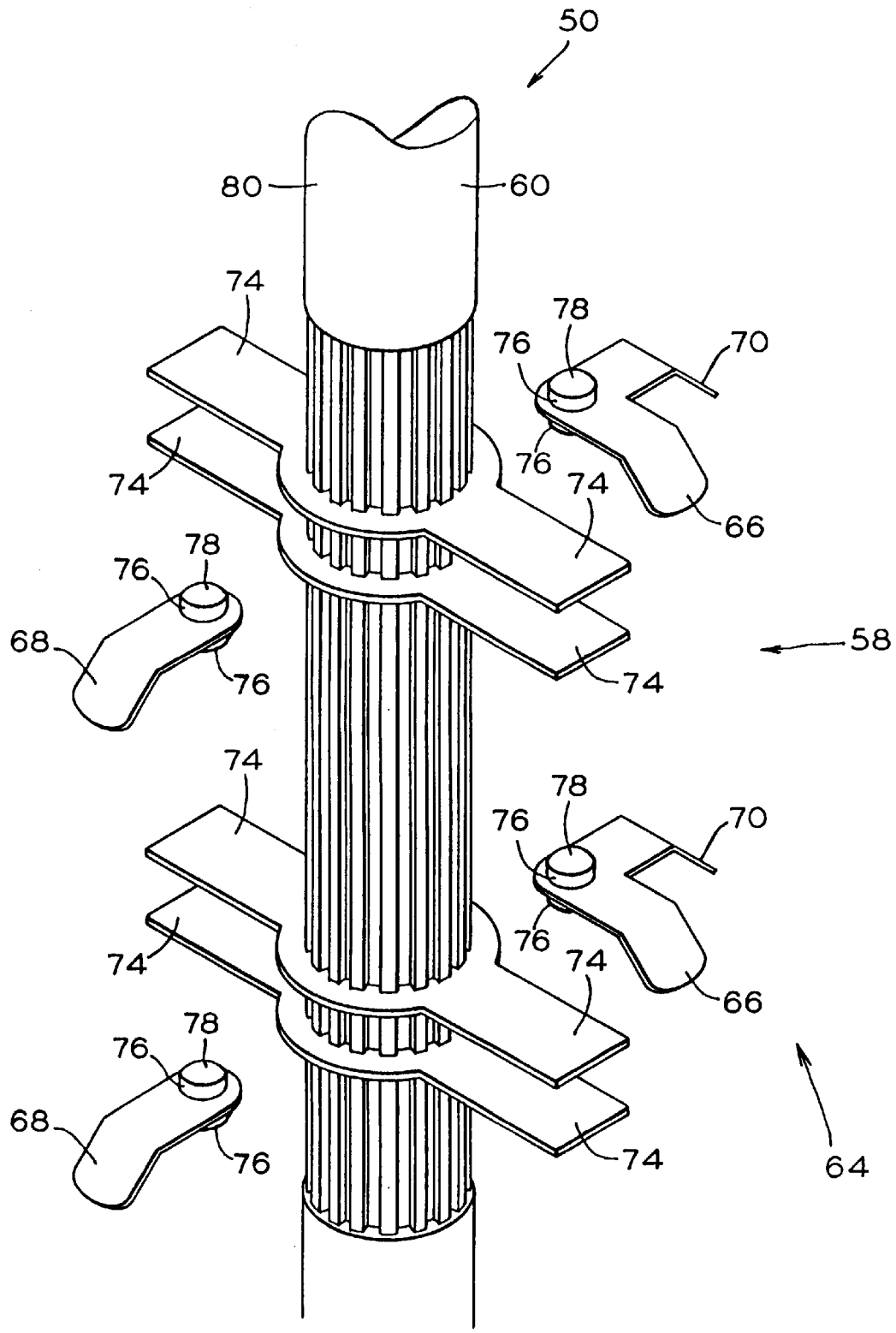
FIG. 4 shows an exploded view of the switch portion of the valve assembly.

Details of switch 50 are shown in FIG. 4. Shaft 80 turns switch moveable portion 60 whenever valve moveable portion 32 is moved by means 42. The means 42 may be a valve handle.

Conducting blades 74 rotate with switch moveable portion 60. Switch stationary portion 58 is held stationary by insulating structures (not shown in this figure).

Conducting blades 74 make contact with pairs of conducting surfaces 76 which have convex surfaces 78. Convex surfaces 78 are for smoothly engaging blades 74 when switch moveable portion 60 is rotated.

The set of first electric line attachment sites 66 are connected to some of the pairs of conducting surfaces 76 shown on the right side of FIG. 4. The set of second electric line attachment sites 68 is connected to conducting surfaces 76 shown on the left side of FIG. 4. Each member of the set of third electric line attachment sites 70 is electrically connected to a corresponding member of the set of first electric line attachment sites 66, as shown.

Figure 5:
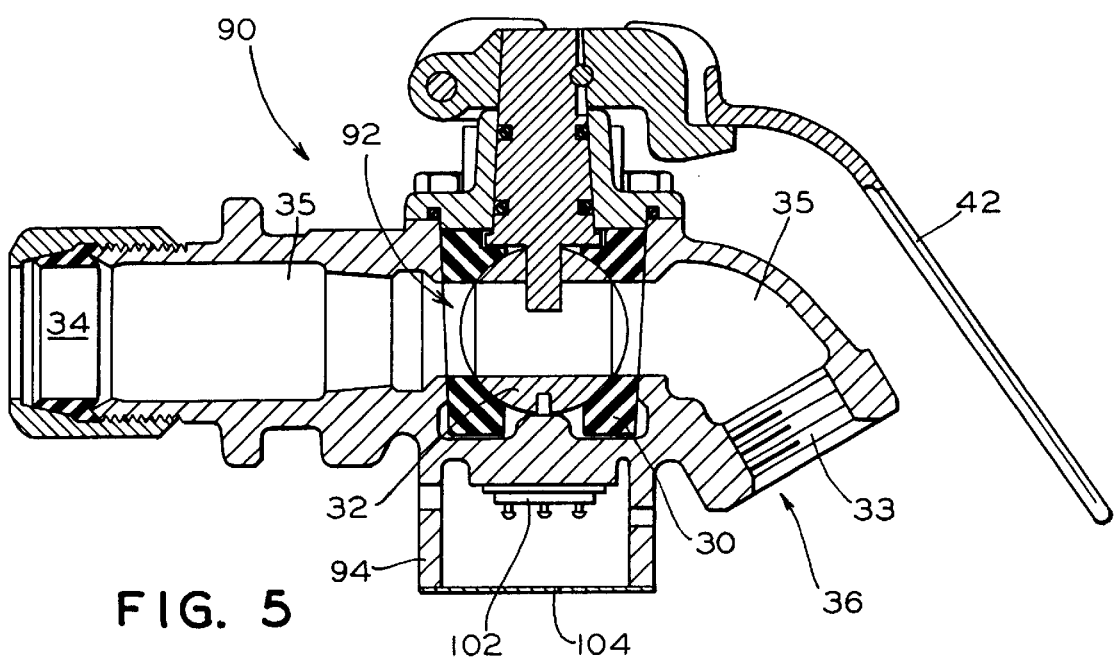
FIG. 5 shows a valve assembly which includes a junction box for joining electrical conductors to equipment on the train to the electrical trainline.

FIG. 5 shows an alternate embodiment of the invention. Shutoff valve assembly 90 has shutoff valve 92 and junction box 94. Junction box 94 has cover 104 and conducting strips 102.

Figure 6A:
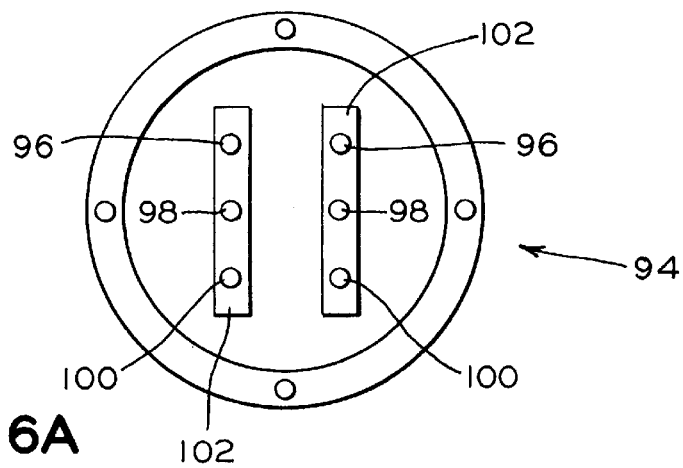
FIG. 6A shows the electric line attachment sites in the junction box.

Detail of conducting strips 102 is shown in FIG. 6A, which shows junction box 94 with cover 104 removed. Conducting strips 102 each have a member 96 of the first set of electric line attachment sites, which are for conductors of car mounted electrical trainline 48. Each conducting strip also has a member 98 of the second set of electric line attachment sites, which are for conductors of conduction lines 49 which are for electrical or electronic equipment (not shown) on railway vehicle 14. Each conducting strip also has a member 100 of the third set of electric line attachment sites, which are for conductors of electrical line end segments 72.

Figure 6B:
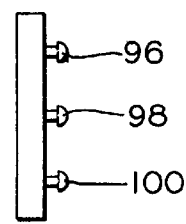
FIG. 6B shows a side view of one of the conducting stripe shown in FIG. 6A.

FIG. 6B shows a side view of one of conducting strips 102 shows that screws threaded into strips 102 which may be used for attachment sites 96, 98 and 100.

Hence, the junction box shown provides for connection of corresponding conductors of the car mounted electrical trainline 48 to corresponding conductors of electrical line end segments 72, and to corresponding members of conduction lines 49 to electrical or electronic equipment on railway vehicle 14.

In greater generality, the invention provides a railroad brake line shutoff valve assembly 10 for connection to a car-mounted railway brake line 12 disposed on a railway vehicle 14 and to a brake line air hose 16. The brake line air hose 16 is for attachment to a brake line connection means 20 of gladhand assembly 18. The gladhand assembly 18 is for connection to a similar gladhand assembly on a second railway vehicle coupled to the first railway vehicle. The shutoff valve assembly has a stationary valve portion 30 and a moveable valve portion 32. The stationary valve portion 30 has a first fluid line attachment site 34 for attachment of the car mounted railway brake line 12 and a second fluid line attachment site 36 for attachment of the brake line air hose 16. Motion of the moveable valve portion relative to the stationary valve portion to a first position opens a flowpath 35 through the valve portion between the first fluid line attachment site 34 and the second fluid line attachment site 36 so that the brake line air hose is connected to the car-mounted brake line. A motion of the moveable valve portion 32 relative to the stationary valve portion 30 to a second position closes the flowpath 35 through the valve portion between the first fluid line attachment site 34 and the second fluid line attachment site 36 so that the brake line air hose 16 is not connected to the car mounted railway brake line 12.

Valve assembly 10 includes an electrical switch 50 for connection to a set of car-mounted electrical trainline conductors 48 mounted on the railway vehicle 14 and to a set of electrical line end segments 72. The electrical line end segments 72 terminate in a multiple contact electrical trainline connection means such as the electrical portion 52 of gladhand assembly 18. The electrical trainline connection means 52 is for connection to a similar electrical trainline connection means on the second railway vehicle coupled to the first railway vehicle. The electrical switch 50 has a stationary portion 58 and a moveable portion 60. The stationary portion of the switch has a junction portion 64. The junction portion 64 has a set of first electric line attachment sites 66 for attachment of the car mounted electrical trainline conductors 48 and a set of second electric line attachment sites 68 for attachment of the electrical line end segments 72. A motion of the moveable portion 60 of switch 50 relative to the stationary portion 58 of switch 50 to a first position making a plurality of switch electrical connections between the set of first electric line attachment sites 66 and the set of second electric line attachment sites 68 so that the electrical line end segments 72 are electrically connected to respective members of the car mounted electrical trainline conductors 48. A motion of the moveable portion 60 of switch 50 relative to the stationary portion 58 of switch 50 to a second position breaking the electrical connections between the first electric line attachment sites 66 and the second electric line attachment sites 68 so that the electrical line end segments 72 are not electrically connected to the electrical trainline conductors 48.

The stationary portion 58 of electrical switch 50 is mechanically connected to the stationary valve portion 30 and the moveable portion 60 of the electrical switch 50 is mechanically connected to the moveable valve portion 32, so that when the moveable valve portion 32 is in the first valve position, then the moveable switch portion 60 is in the first switch position and when the moveable valve portion 32 is in the second valve position, then the moveable switch portion 60 is in the second switch position. Hence, when the moveable valve portion 32 is placed in the first valve position relative to the stationary valve portion 30 so that the valve is opened, the electrical switch 50 is closed and so that when the moveable valve portion 32 is placed in the second valve position relative to the stationary valve portion 30 so that the valve is closed, the electrical switch is opened. It should be noted that this reciprocal-sounding relationship is a matter of language. A valve is said to be open when it permits fluid flow and a switch is said to be closed when it permits electrical current flow.

Hence, with switch and valve connected as described above, when the valve is in position for admitting fluid flow, the switch is in position to admit electrical current flow, and when the valve is in position to block fluid flow, the switch is in position to block electrical current flow. The utility of this provision is to prevent hot contacts on the multiple contact electrical trainline connection means 52 when the switch is closed prior to connecting gladhand assembly 18 to another gladhand or prior to disconnecting gladhand assembly 18 from another gladhand to which it is connected. (This disconnection occurs when adjacent railway vehicles are uncoupled and pulled apart.)

The invention includes means 42 attached to either the moveable valve portion 32 or the moveable portion of the switch 50 for moving the moveable valve portion 32 from the first valve position to the second valve position and the moveable portion of the switch 50 from the first switch position to the second switch position and for moving the moveable valve portion 32 from the second valve position to the first valve position and the moveable portion of the switch 50 from the second switch position to the first switch position. Means 42 may be a handle, as in the preferred embodiment described above.

The junction portion 64 of switch 50 also has a set of third electric line attachment sites 70. These have electrical connections to respective members of the first electric line attachment sites 66. The third electric line attachment sites 70 are for connection of respective conductors of a branch electric line 49 to either an electronic system or an electrical system located on the first railway vehicle 14.

The number of first electric line attachment sites 66 may be two electric line attachment sites, the number of second electric line attachment sites 68 may be two electric line attachment sites and the number of third electric line attachment sites 70 may be two electric line attachment sites.

The electrical switch 50 may have a conducting blade 74 on moveable portion 60 and a conducting member on the stationary portion 58 which has a pair of surfaces 76 for contacting two opposite surfaces of blade 74, thereby making redundant electrical contacts. To facilitate the process of making electrical contact, surfaces 76 may have a convex portion 78.

The motion of moveable valve portion 32 may be a rotary motion. The motion of moveable switch portion 60 may be a rotary motion. Shaft connection 80 may be used to connect moveable valve portion 32 to moveable switch portion 60.

The first fluid line attachment site 34 may be a compression fitting for sealing against an exterior portion of car-mounted railway brake line 12. The second fluid line attachment site 36 may be internal pipe threads for attachment of a pipe nipple 17 of brake line air hose 16.

In another aspect, the invention provides railroad brake line shutoff valve assembly 90 for connection to a car-mounted railway brake line 12 disposed on a railway vehicle 14 and to a brake line air hose 16. The brake line air hose 16 is for connecting to a brake line connection means 20 on gladhand assembly 18, the gladhand assembly 18 being for connection to a similar gladhand assembly on a second railway vehicle coupled to railway vehicle 14. The shutoff valve assembly 90 has a stationary valve portion 30 and a moveable valve portion 32. The stationary valve portion 30 has a first fluid line attachment site 34 for attachment of the car mounted railway brake line 12 and a second fluid line attachment site 36 for attachment of the brake line air hose 16. A motion of the moveable valve portion 32 relative to the stationary valve portion 30 to a first position opens a flowpath 35 through the valve 92 between the first fluid line attachment site 34 and the second fluid line attachment site 36 so that the brake line air hose 16 has fluid flow connection to the car-mounted brake line 12. A motion of the moveable valve portion 32 relative to the stationary valve portion 34 to a second position closing the flowpath 35 through the valve 92 between the first fluid line attachment site 34 and the second fluid line attachment site 36 so that the brake line air hose 16 is not connected to the car mounted railway brake line 12.

Means 42 is attached to the moveable valve portion 32 for moving the moveable valve portion 32 from the first position to the second position and from the second position to the first position.

Valve assembly 90 also includes an electrical junction box 94 which has a first set of electric line attachment sites 96 for connection of a set of car-mounted electrical trainline conductors 48 mounted on railway vehicle 14. The number of first electric line attachment sites 96 may be two.

Junction box 94 also has a second set of electric line attachment sites 98 for connection of a set of electrical line end segments 72. The number of second electric line attachment sites 98 may be two. The electrical line end segments 72 are for terminating in a multiple contact electrical trainline connection means 52, for example, the electrical portion of gladhand assembly 18. Connection means 52 may be an electrical connector independent of the brake line air hose connector or, preferably, is included with it in a gladhand assembly such as gladhand assembly 18. The electrical trainline connection means 52 is for connection to a similar electrical trainline connection means on another railway vehicle coupled to railway vehicle 14.

Junction box 94 also has a third set of electric line attachment sites 100 which are for connection of respective conductors of a branch electric line 49 for connection to either an electronic system or an electrical system located on railway vehicle 14. The number of third electric line attachment sites may be two.

Each member of the first set of electric line attachment sites 96 is electrically connected to a corresponding member of the second set of electric line attachment sites 98 and also to a corresponding member of the third set of electric line attachment sites 100.

In another aspect, the invention provides a method for connecting either an electronic system mounted on a railway vehicle 14 or an electrical system mounted on the railway vehicle 14 to individual conductors of an electrical trainline cable 48 mounted on railway vehicle 14 and for connecting individual connectors of an electrical line end segment 72 connected to a multiple contact trainline connection means 52 for connection to a similar electrical trainline connection means on an adjacent railway vehicle coupled to railway vehicle 14 to electrical trainline cable 48 and for providing a brake line shutoff valve 92. The method includes providing a brake line shutoff valve assembly 90 with an electrical junction box 94 having a first set of electric line attachment sites 96, a second set of electric line attachment sites 98 and a third set of electric line attachment sites 100. The number of first electric line attachment sites may be two, the number of second electric line attachment sites may be two and the number of third electric line attachment sites may be two. Each member of the first set of electric line attachment sites 96 is electrically connected to a corresponding member of the second set of electric line attachment sites 98 and also to a corresponding member of the third set of electric line attachment sites 100.

The method also includes the step of connecting each individual conductor of the electrical trainline 48 to a corresponding one of the first set of electric line attachment sites 96. The method also includes connecting each individual conductor of the electrical line end segment 72 to a corresponding one of the second set of electric line attachment sites 98, providing a branch electrical line 49 having a plurality of individual conductors and connecting each individual conductor of the branch electrical line 49 to a corresponding one of the third set of electric line attachment sites and also connecting the branch electric line to the electronic system or electrical system mounted on the railway vehicle.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. A railroad brake line shutoff valve assembly for connection to a car-mounted railway brake line disposed on a first railway vehicle and to a brake line air hose, such brake line air hose for terminating in a gladhand assembly, such gladhand assembly for connection to a similar gladhand assembly on a second railway vehicle coupled to such first railway vehicle, said shutoff valve assembly comprising:

a stationary valve portion and a moveable valve portion, said stationary valve portion having a first fluid line attachment site for attachment of such car mounted railway brake line and a second fluid line attachment site for attachment of such brake line air hose, a motion of said moveable valve portion relative to said stationary valve portion to a first position opening a flowpath through a valve portion between said first fluid line attachment site and said second fluid line attachment site so that such brake line air hose is connected to such car-mounted railway brake line and a motion of said moveable valve portion relative to said stationary valve portion to a second position closing said flowpath through said valve portion between said first fluid line attachment site and said second fluid line attachment site so that such brake line air hose is not connected to such car mounted railway brake line;

an electrical switch for connection to a predetermined number of car-mounted electrical trainline conductors mounted on such first railway vehicle and to a predetermined number of electrical line end segments, such electrical line end segments terminating in a multiple contact electrical trainline connection means, such electrical trainline connection means for connection to a similar electrical trainline connection means on such second railway vehicle coupled to such first railway vehicle, said electrical switch having a stationary portion and a moveable portion, said stationary portion of said switch having a junction portion, said junction portion having a predetermined number of first electric line attachment sites for attachment of such predetermined number of car mounted electrical trainline conductors, said junction portion further having a predetermined number of second electric line attachment sites for attachment of such electrical line end segments, and said junction portion further having a predetermined number of third electric line attachment sites, said third electric line attachment sites having electrical connections to respective members of said first electric line attachment sites, said third electric line attachment sites for connection of respective conductors of a branch electric line to at least one of an electronic system and an electrical system located on such first railway vehicle;

a motion of said moveable portion of said switch relative to said stationary portion of said switch to a first position making a predetermined number of switch electrical connections between individual members of said first electric line attachment sites and said second electric line attachment sites so that such electrical line end segments are electrically connected to respective members of such car mounted electrical trainline conductors and a motion of said moveable portion of said switch relative to said stationary portion of said switch to a second position breaking said switch electrical connections between said first electric line attachment sites and said second electric line attachment sites so that such electrical line end segments are not electrically connected to such electrical trainline conductors;

said stationary portion of said electrical switch being mechanically connected to said stationary valve portion and said moveable portion of said electrical switch being mechanically connected to said moveable valve portion, so that when said valve portion is in said first valve position, then said switch is in said first switch position and when said valve portion is in said second valve position, then said switch is in said second switch position, so that when said moveable valve portion is placed in said first valve position relative to said stationary valve portion so that said shutoff valve is opened said electrical switch is closed and so that when said moveable valve portion is placed in said second valve position relative to said stationary valve portion so that said shutoff valve is closed said electrical switch is opened; and means attached to at least one of said moveable valve portion and said moveable portion of said switch for moving said moveable valve portion from said first valve position to said second valve position and said moveable portion of said switch from said first switch position to said second switch position, and for moving said moveable valve portion from said second valve position to said first valve position and said moveable portion of said switch from said second switch position to said first switch position.

2. A railroad brake line shutoff valve assembly according to claim 1 wherein said predetermined number of first electric line attachment sites is at least two.

3. A railroad brake line shutoff valve assembly according to claim 1 wherein said predetermined number of second electric line attachment sites is at least two.

4. A railroad brake line shutoff valve assembly according to claim 1 wherein said predetermined number of third electric line attachment sites is at least two.

5. A railroad brake line shutoff valve assembly according to claim 1 wherein said predetermined number of switch electrical connections is at least two.

6. A railroad brake line shutoff valve assembly according to claim 5 wherein said electrical switch has, for each of said predetermined number of switch electrical connections, a conducting blade on said moveable portion of said switch and a conducting member on said stationary portion of said switch, said conducting member having a pair of surfaces for contacting a first side of said conducting blade and a second side of said conducting blade when said electrical switch is in said first switch position thereby providing redundant electrical contacts.

7. A railroad brake line shutoff valve assembly according to claim 6 wherein said pair of surfaces have at least a portion thereof convex.

8. A railroad brake line shutoff valve assembly according to claim 1 wherein said motion of said moveable valve portion is a rotary motion.

9. A railroad brake line shutoff valve assembly according to claim 1 wherein said motion of said moveable portion of said switch is a rotary motion.

10. A railroad brake line shutoff valve assembly according to claim 1 wherein said motion of said moveable valve portion is a rotary motion about an axis and said motion of said moveable portion of said switch is a rotary motion about said axis.

11. A railroad brake line shutoff valve assembly according to claim 1 wherein said moveable portion of said electrical switch is connected to said moveable valve portion by a shaft connection.

12. A railroad brake line shutoff valve assembly according to claim 1 wherein said first fluid line attachment site includes a compression fitting for sealing against an outer portion of such car mounted railway brakeline.

13. A railroad brake line shutoff valve assembly according to claim 1 wherein said second fluid line attachment site has an internal pipe thread for receiving a threaded nipple on such brake line air hose.

14. A railroad brake line shutoff valve assembly for connection to a car-mounted railway brake line disposed on a first railway vehicle and to a brake line air hose, such brake line air hose for terminating in a gladhand assembly, such gladhand assembly for connection to a similar gladhand assembly on a second railway vehicle coupled to such first railway vehicle, said shutoff valve assembly comprising:

a stationary valve portion and a moveable valve portion, said stationary valve portion having a first fluid line attachment site for attachment of such car mounted railway brake line and a second fluid line attachment site for attachment of such brake line air hose, a motion of said moveable valve portion relative to said stationary valve portion to a first position opening a flowpath through said shutoff valve between said first fluid line attachment site and said second fluid line attachment site so that such brake line air hose is connected to such car-mounted brake line, and a motion of said moveable valve portion relative to said stationary valve portion to a second position closing said flowpath through said shutoff valve between said first fluid line attachment site and said second fluid line attachment site so that such brake line air hose is not connected to such car mounted railway brake line;

means attached to said moveable valve portion for moving said moveable valve portion from said first position to said second position and from said second position to said first position; and an electrical junction box including;
  a predetermined number of first electric line attachment sites for connection of a predetermined number of car-mounted electrical trainline conductors mounted on such first railway vehicle,
  a predetermined number of second electric line attachment sites for connection of a predetermined number of electrical line end segments, such electrical line end segments for terminating in a multiple contact electrical trainline connection means, such electrical trainline connection means for connection to a similar electrical trainline connection means on such second railway vehicle coupled to such first railway vehicle, each of said predetermined number of second electric line attachment sites being connected to a corresponding member of said predetermined number of said first electric line attachment sites, and
  a predetermined number of third electric line attachment sites for connection of a predetermined number of respective conductors of a branch electric line to at least one of an electronic system and an electrical system located on such first railway vehicle, each of said predetermined number of third electric line attachment sites being connected to said corresponding member of said predetermined number of said first electric line attachment sites.

15. A railroad brake line shutoff valve assembly according to claim 14 wherein said predetermined number of first electric line attachment sites is at least two.

16. A railroad brake line shutoff valve assembly according to claim 14 wherein said predetermined number of second electric line attachment sites is at least two.

17. A railroad brake line shutoff valve assembly according to claim 14 wherein said predetermined number of third electric line attachment sites is at least two.

18. A method for connecting at least one of an electronic system mounted on a first railway vehicle and an electrical system mounted on said first railway vehicle to individual conductors of an electrical trainline cable mounted on said railway vehicle and for connecting individual conductors of an electrical line end segment, connected to a multiple contact electrical trainline connection means for connection to a similar electrical trainline connection means on an adjacent second railway vehicle coupled to said first railway vehicle, to said electrical trainline cable and for providing a brake line shutoff valve, said method comprising:

providing said brake line shutoff valve with an electrical junction box having a predetermined number of first electric line attachment sites, a predetermined number of second electric line attachment sites and a predetermined number of third electric line attachment sites, each of said second electric line attachment sites having electrical connection to a corresponding one of said first electric line attachment sites, each of said third electric line attachment sites having electrical connection to said corresponding one of said first electric line attachment sites;

connecting each individual conductor of said electrical trainline cable to said corresponding one of said predetermined number of first electric line attachment sites;

connecting each individual conductor of said electrical line end segment to a corresponding one of said predetermined number of second electric line attachment sites;

providing a branch electrical line having a plurality of individual conductors;

connecting each individual conductor of said branch electrical line to a corresponding one of said predetermined number of third electric line attachment sites; and connecting said branch electric line to said at least one of an electronic system mounted on said first railway vehicle and an electrical system mounted on said first railway vehicle.

19. A method according to claim 18 wherein said predetermined number of first electric line attachment sites is at east two.

20. A method according to claim 18 wherein said predetermined number of second electric line attachment sites is at least two.

* * * * *